Sept. 7, 1926.
J. R. STEPHENS
1,598,889
AUTOMATIC VALVE FOR WATER GAUGES
Filed Oct. 19, 1923
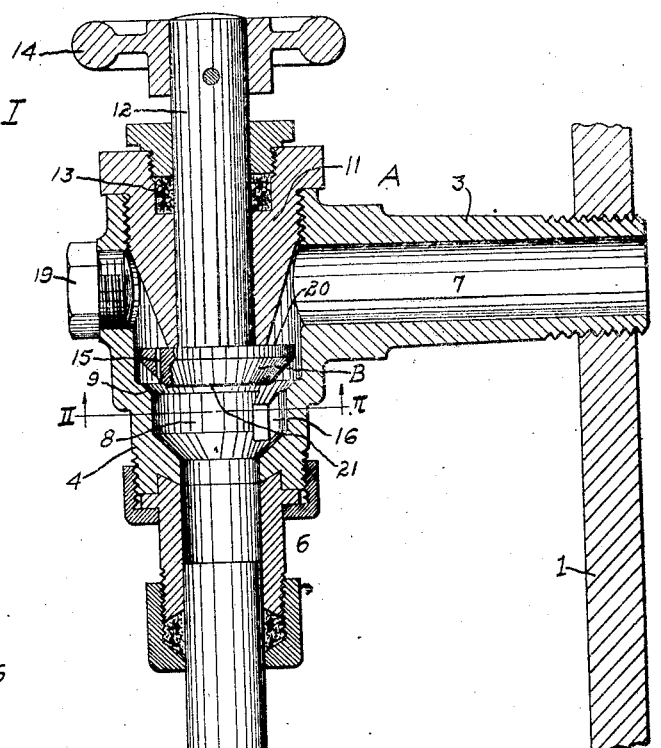
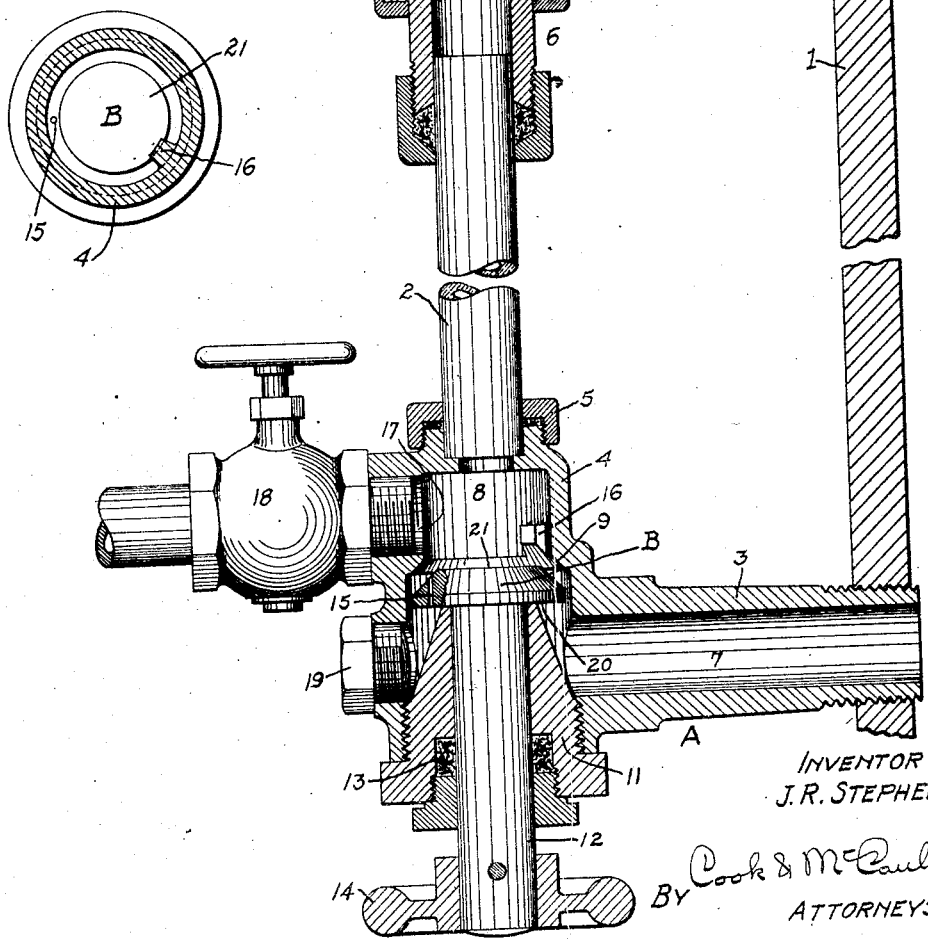
INVENTOR
J. R. STEPHENS
By Cook & McCauley
ATTORNEYS Patented Sept. 7, 1926.

1,598,889

UNITED STATES PATENT OFFICE.

JOHN R. STEPHENS, OF GERMANTOWN, PENNSYLVANIA, ASSIGNOR OF ONE-THIRD TO ERNEST P. PRATOR AND ONE-THIRD TO JOHN T. FREDRICKS, BOTH OF LEEPER, MISSOURI.

AUTOMATIC VALVE FOR WATER GAUGES.

Application filed October 19, 1923. Serial No. 669,634.

This invention relates to improvements in automatic valves adapted for use with water gauges and other devices wherein it is desirable to automatically close an outlet for fluid under pressure. The ordinary water gauge for steam boilers includes a glass tube showing the water level, and one of my objects is to produce a simple and reliable automatic device adapted to prevent free escape of steam and water when the glass tube is accidentally broken.

To produce an entirely successful automatic device of this kind, several sources of trouble and danger must be recognized and eliminated. There should be no liability of causing a false indication of the water level, as this would render the device very dangerous, and the automatic valve should be positively and forcibly shifted in response to the predetermined valve-operating conditions. The automatic valve should be very securely held in the positions to which it is shifted, so as to avoid accidental displacement of the valve. These conditions are, of course, essential. It is also desirable to dispense with unnecessary passageways wherein mud, scale and other foreign matter would be liable to accumulate and affect either the operation of the valve, or the accuracy of the gauge, and all passageways should be accessible for inspection and cleaning. Moreover, simplicity of construction is highly important, not only to reduce the manufacturing cost, but also to avoid the uncertainty of complex automatic elements.

Generally stated, my object is to produce an automatic valve device of this kind adapted to positively perform its function without liability of causing a dangerous or unsafe condition. A further object is to accomplish this by means of an extremely simple and inexpensive device having no attachments to render it complex or uncertain. An additional object is to produce a device complying with the most rigid laws, rules and regulations that have heretofore forbidden the use of automatic valves of this kind. In the specific structure, I propose to obtain all of the advantages and none of the disadvantages herein pointed out.

With the foregoing and other objects in view, the invention comprises the novel construction, combination and arrangement of parts hereinafter more specifically described and illustrated in the accompanying drawings wherein is shown the preferred embodiment of the invention. However, it is to be understood that the invention comprehends changes, variations and modifications which come within the scope of the claims hereunto appended.

To illustrate the invention I have shown a simple check valve which is normally held in its open position by the fluid pressure in the valve housing. This pressure firmly forces the valve away from its seat, so under normal conditions the fluid can freely pass to and from the gauge without incurring any danger of displacing the valve.

When there is a sudden discharge of fluid at a point beyond the automatic valves, for instance, if steam and water should be discharged through a broken water glass or through a hand-operated valve used to test the automatic device, the outgoing fluids rushing rapidly through the valve housings will instantly close the automatic valves, thereby stopping the flow at the glass or testing valve. The boiler pressure will then forcibly hold the automatic valves in their closed positions. Thereafter, when the testing valve is closed, or when a new glass is substituted for the broken glass, the automatic valves will return to their open positions. This reopening of the valves is a forcible and positive action, and it automatically establishes the normal conditions whereby the fluid pressure forcibly retains the valves in their open positions.

I will hereafter point out the manner in which these four results, namely, the closing of a valve, holding it in its closed position, then the reopening of the valve and finally holding it open under normal conditions, are all very forcibly and certainly accomplished by the fluid under pressure acting on an extremely simple check valve.

Fig. I is a vertical section, partly in elevation, illustrating a water gauge embodying the features of this invention.

Fig. II is a transverse section on line II—II in Fig. I, showing the by-pass or leakage port through which fluid under pressure is transmitted to open the automatic valves.

1 designates a boiler wall and 2 is an indicating gauge member consisting of a vertical glass tube, known as a water glass, adapted to indicate the water level in the boiler. Upper and lower conductors extend from the boiler to the respective ends of the water glass. Each of these conductors includes a hollow angular member A connecting the water glass to the boiler, each member A having a hollow stem 3 screwed into the boiler wall, and an extension 4 to which the water glass may be secured by means of the usual coupling elements at 5 and 6. An inlet passage 7 is formed in each stem 3, and each extension 4 is provided with an outlet passage 8 through which fluid is discharged in the event of breakage of the water glass.

Each of the hollow conductors A is provided with a beveled annular valve seat 9 between its inlet and outlet passages, and a check valve B lies between the valve seat 9 and the inlet passage 7, said valve having a beveled face conforming to and adapted to engage the seat 9. Valve holders 11 are screwed into the respective members A and each valve has a stem 12 slidably mounted in one of the valve holders. A stuffing box 13 may be formed in each valve holder to prevent leakage around the valve stem which preferably extends entirely through the valve holder to receive an operating wheel or handle 14. A by-pass, or restricted leakage port 15, is preferably formed in each valve B, so as to permit leakage of fluid under pressure when the valve occupies its closed position, and each valve seat 9 has an extension 16 with a beveled face adapted to close the restricted port 15. When the valve is closed, its operating wheel 14 can be turned to locate the port 15 at the extension 16, thus preventing leakage, and the operating wheel can also be oscillated to grind the valve and its seat.

To test the automatic valves, the lower angular conductor A has an outlet port 17 in its discharge passageway 8, and any suitable type of valve can be used to control the discharge through this port 17. As a simple illustration of this feature, I have shown an ordinary manually operated valve 18 screwed into the port 17.

All of the passages should be accessible for cleaning and inspection so as to comply with the rigid rules and laws governing the operation of boilers. Each valve holder 11 can be readily removed to expose its valve B, at the same time exposing the valve seat and all of the faces of the vertical passageway leading to the water glass. Each angular conductor A is provided with a plug 19 located directly opposite the passageway 7, and this plug can be readily unscrewed to expose said passageway.

I will now describe the combination of co-operating elements whereby the simple check valves are securely held in their open positions during the normal operating conditions, and forcibly closed in response to breakage of the water glass or the opening of testing valve 18. When the valves are thus automatically closed, they are firmly held on their seats until the normal conditions are again established by closing the testing valve, or by installing a new water glass, whereupon the automatic valves are forcibly opened and then held in their open positions. The peripheral edge of each check valve preferably lies close to the wall of the passageway in which the valve is mounted, so when there is a forcible discharge of fluid from inlet passage 7 to discharge passage 8, the outgoing fluid will forcibly impinge upon the face 20 of the valve, thereby closing the valve and forcibly holding it on its seat. The face 20 will therefore be termed a valve-closing abutment, and it is important to observe that the valve has this abutment on the side toward the inlet passage 7 through which the fluid passes to the valve seat.

When the valves are closed, leakage occurs through one or both of the restricted ports 15, to indicate that a glass is broken, or that the testing valve 18 is open. When the testing valve is closed, or a new glass installed, the pressure transmitted through ports 15 gradually rises until the pressure in the water glass is equal to the boiler pressure. To explain the effect of this condition, I must again refer to certain elements of the simple automatic valve device.

Each automatic valve has the valve-closing abutment 20 on one side, and the fluid pressure on this side is utilized to securely hold the valve in its closed position. The other side, which engages the seat 9, is provided with a valve-opening abutment 21, and under the conditions just pointed out the pressure resulting from leakage through ports 15 gradually rises until the pressure considered in pounds per square inch is uniform at opposite sides of the valve. The automatic valves should be very forcibly and positively opened in response to the gradually increasing pressure transmitted through ports 15.

This requires a further explanation of the element 12 which has been referred to as a stem. This element may be of any desired form, but it should extend from the valve-closing abutment 20, and it should be exposed to a relatively low pressure, preferably atmospheric pressure, for it constitutes a pressure-reducing member which permits automatic opening of the valve in response to the pressure on the abutment 21. Note that the valve-closing abutment 20 surrounds this pressure-reducing member 12, and that the outer end of member 12 is exposed to the atmosphere, while the relatively large valve-opening abutment 21 is exposed to the pressure transmitted through ports 15.

Consequently, the pressure on abutment 21 will force the valve to its open position and positively hold it there. As a simple illustration of this action, assume that the area of the valve-opening abutment is 2 square inches and that a corresponding area at the other side is equally divided to give one square inch at the outer end of stem 12 and one square inch at the abutment 20. If the boiler pressure is 100 lbs. per square inch, there will be a normal pressure of about 100 pounds tending to hold the valve in its open position. When the valve is automatically closed, there will be a pressure of about 100 pounds on the abutment 20 tending to retain the valve in its closed position. Thereafter the pressure transmitted through ports 15 will act upon the two square inches of abutment 21, so as to overcome the pressure on one square inch of abutment 20, it being possible under these conditions to obtain about 200 pounds pressure on abutment 21 to overcome the 100 pounds on abutment 20.

To obtain all of these results in a simple valve device having no complex or uncertain operating means, the elements at opposite sides of the valve should be properly combined with the gauge and arranged in certain relative positions so as to forcibly accomplish all of the automatic operations. One side of each valve B is provided with the relatively large valve-opening abutment 21, and also with the face which engages the seat 9. This side of the valve lies toward the water glass 2 and testing valve 18 through which fluid under pressure may be discharged. The other side of valve B lies toward the boiler and it has the valve-closing abutment 20 and the pressure-reducing element 12 exposed to the atmosphere and adapted to move freely in the guide or holder 11. The pressure-reducing member 12, associated with the other elements in this manner, is an important factor of the combination. It does not affect the automatic closing of the valve, and it enables the valve to be forcibly opened in response to a relatively low degree of pressure on the abutment 21. Furthermore, under normal conditions, the fluid pressure retaining the valve in its open position is equal to the number of pounds per square inch multiplied by the area of the outer end of member 12. If this area is one square inch and the boiler pressure 100 pounds, there will be a pressure of 100 pounds holding the valve in its open position. Under normal operating conditions, water and steam will flow back and forth through the valve housings, but this will not displace the automatic valves. Even if a person should manually close one of the valves B by pushing against its operating wheel 14, the valve will automatically return to its open position when the wheel is released.

Another advantage lies in the fact that the valve seats 9 can be ground by opening the testing valve 18 and then oscillating the wheels 14 while the fluid pressure forces the valves onto their seats. Thereafter, the testing valve is closed to automatically open the valves B, and it is not necessary for these valves to move simultaneously.

The packing in stuffing boxes 13 is intended to prevent leakage along the pressure-reducing members 12, but when a valve B occupies its open position the inner margin of its abutment 20 engages the end of valve holder 11 surrounding the member 12, so as to limit the opening stroke of the valve and at the same time prevent leakage through the valve holder. The valve itself thus cooperates with the packing to prevent leakage through the valve holder.

I claim:—

1. In a device for automatically preventing rapid discharge of fluid under pressure, a valve housing provided with a valve seat, an automatic check valve normally held in its open position by the fluid pressure and adapted to engage said seat to prevent rapid discharge of the fluid, one side of said check valve having a valve-closing abutment on which the outgoing fluid impinges to close the valve, the same side of the valve being provided with a pressure-reducing extension exposed to the atmosphere to permit forcible opening of the valve in response to uniform fluid pressure at opposite sides of the valve, and the valve being provided with a restricted by-pass through which the fluid is conducted to open the valve.

2. In a device for automatically preventing rapid discharge of fluid under pressure, a valve housing provided with a valve seat and a valve holder alined with said seat, an automatic check valve normally held in its open position by the fluid pressure in said housing, said valve being interposed between said seat and valve holder so as to engage the seat in response to a rapid discharge of fluid therethrough, the side of the valve toward said valve holder being provided with a valve-closing abutment on which the outgoing fluid impinges, the same side of the valve being provided with a stem slidably mounted in said holder and also with a contact face cooperating with said valve holder to prevent leakage along said stem, the other side of said valve being provided with a valve-opening abutment, the outer end of said stem being exposed to the atmosphere, the device being provided with a restricted by-pass through which fluid under pressure is transmitted from the first mentioned side of said valve to the valve-opening abutment at the other side, and a testing valve for the purpose described located beyond said valve-opening abutment and arranged to receive the fluid under pressure transmitted through said by-pass.

In testimony that I claim the foregoing I hereunto affix my signature.

JOHN R. STEPHENS.